May 26, 1931. A. D. MERRILL 1,807,320
DIGESTING AND COOKING LIQUOR PREPARATION SYSTEM
Filed June 24 1930 3 Sheets-Sheet 1
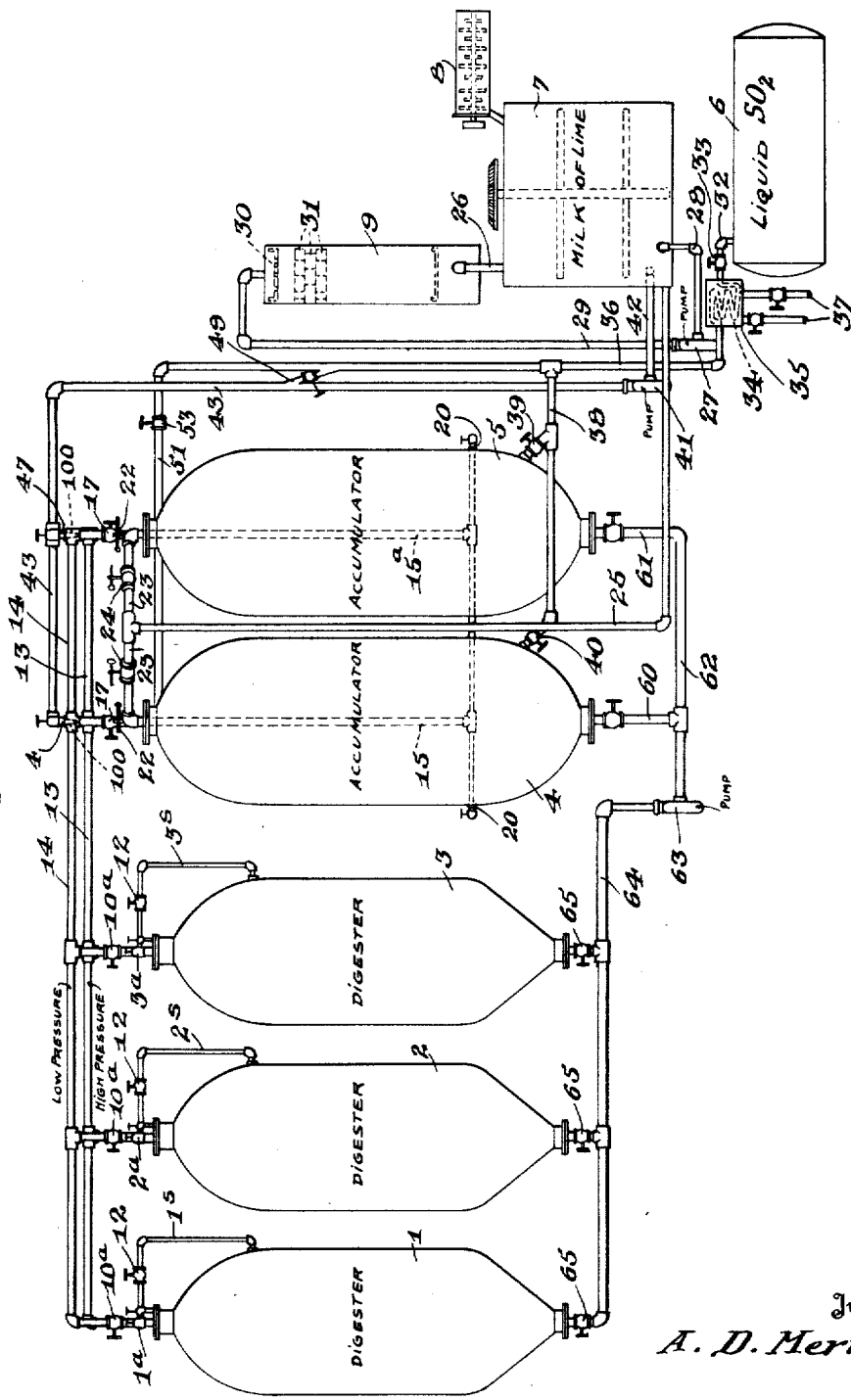

May 26, 1931.  A. D. MERRILL  1,807,320
DIGESTING AND COOKING LIQUOR PREPARATION SYSTEM
Filed June 24, 1930  3 Sheets-Sheet 2

Inventor
A. D. Merrill
By Robt. E. Barry
Attorney

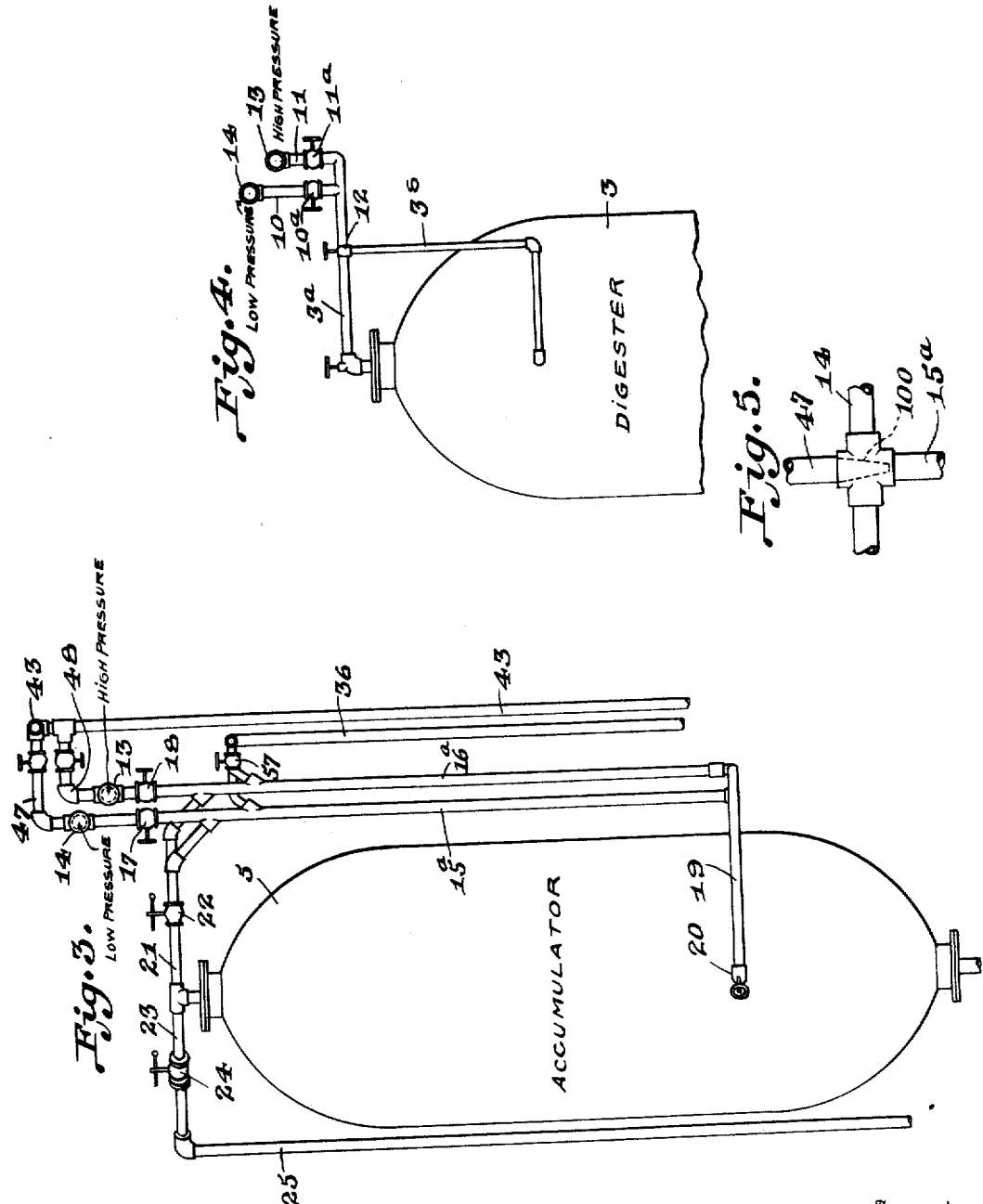

Patented May 26, 1931

1,807,320

UNITED STATES PATENT OFFICE

ALBERT DAVIES MERRILL, OF WATERTOWN, NEW YORK

DIGESTING AND COOKING LIQUOR PREPARATION SYSTEM

Application filed June 24, 1930. Serial No. 463,438.

This invention relates to the manufacture of paper pulp, and more especially to a novel system for making the acid liquor used in the digestion of fibrous material, and for recovering the heat units and gases from digesting systems.

It is customary in pulp plants to employ an acid preparation system from which the acid liquor is supplied to the digesting system, and the primary object of the present invention is to provide a new type of plant which will avoid the necessity of having an acid system. In other words, in accordance with my invention, the acid liquor is prepared in the digesting system, and the accumulators of the digesting system are employed for the accumulation of acid liquor, so as to avoid the use of a separate acid system.

Pursuant to my invention, the digesting system is provided with at least two accumulators, either one of which may operate as a high pressure or a low pressure accumulator, whereby the accumulator may be used alternately, first for high pressure purposes, and second, for low pressure purposes. To this end, a distributor arranged at the lower portion of each accumulator, is connected by a pair of down pipes, to the high pressure header and the low pressure header, so that gas, vapor or liquid from either of these headers may be fed into the accumulator. Each of these down pipes is also connected by a valved conduit to the top portion of its respective accumulator, so that gas escaping from the top of an accumulator, may be fed directly back into the lower portion of the same accumulator.

Furthermore, the system is such that $SO_2$ gas from a storage chamber may be fed into any one of the down pipes.

In addition, each down pipe is connected to a milk of lime tank, so that milk of lime may be contacted with the $SO_2$ gas as well as with gas, vapor or liquid from the digesters, on its way to one or the other of the accumulators.

A further object of the invention is to provide a system of this character, in which gases from the accumulators may flow into the milk of lime tank to be absorbed by the milk of lime in said tank.

Another object is to furnish such a system in which the pipes which lead the $SO_2$ gas and the milk of lime to the down pipes, are inter-connected by a valved conduit, by which the gas may be mixed with the milk of lime while the latter is on its way to the down pipes.

A still further object is to provide such a system in which the $SO_2$ gas may be led from a storage tank into the lower end of either one of the accumulators.

Another object is to furnish an apparatus of this type, in which the acid liquor made in the accumulators is heated by hot gas, vapor or liquor coming over from the digesters, whereby the hot fresh preconditioned liquor may be subsequently pumped into a digester that has just been filled with chips for immediately starting the cooking operation in the latter digester.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a side elevation of my improved apparatus.

Fig. 2 is a top plan view of the same.

Fig. 3 is a detail vertical sectional view on the line 3—3 of Fig. 2.

Fig. 4 is a similar view of a detail on the line 4—4 of Fig. 2.

Fig. 5 is a sectional view of a detail showing one of the injector fittings for feeding milk of lime across one of the relief fluid headers into one of the down pipes leading into one of the accumulators.

In all of the figures of the drawings, the apparatus is diagrammatically shown, due to the fact that the multiplicity of pipes used makes it necessary to alter the actual positions of the pipes, so that they may be readily seen in the drawings.

In the drawings, 1, 2 and 3 designate conventional digesters, and 4 and 5 indicate pressure accumulators. While I have shown three digesters and two accumulators, it will, of course, be understood that one or more digesters may be used, and that one or more accumulators may be employed.

6 designates a storage tank for liquid $SO_2$ which is held in the tank under a pressure of from thirty to one hundred pounds per square inch. 7 is a closed milk of lime tank, and 8 represents two lime slackers. An absorption tower is shown at 9.

The digesters are provided with top relief branches 1a, 2a, and 3a, each of which is branched as at 10 and 11, the branches being provided with valves 10a and 11a.

The side relief pipes 1a, 2a, 3a, each having a control valve 12, lead from the sides of the digesters into the top relief pipes, and the branches of the latter lead to the high and low pressure headers 13 and 14.

These headers communicate with down pipes 15, 15a, 16 and 16a, the low pressure header being in direct connection with the pipes 15 and 15a, and the high pressure header being in direct connection with the pipes 16 and 16a, but as best shown in Fig. 3, valves 17 and 18 are arranged in the down pipes to control the passage of the relief fluids from the low and high pressure headers to the accumulators.

Each pair of down pipes 15, 16 and 15a, 16a, are connected at their lower ends to a distributor 19 that has valve controlled nozzles 20, leading into the accumulator from various points.

The top of each accumulator is joined to the respective down pipes of that accumulator by a branched conduit 21, that is provided with a pressure operated valve 22, whereby when the pressure in an accumulator reaches a predetermined degree, gas from the accumulator may flow through the conduit 21 directly back into its down pipes.

Other conduits 23 having pressure actuated valves 24 therein are connected together, and empty into a pipe 25 which leads to the lower portion of the milk of lime tank, so that any gases passing through the pipe 25 may be absorbed by the milk of lime in the tank 7. In case the absorption should not be complete, the gas will discharge from the tank 7 through a pipe 26, into the absorption tower 9, down which milk of lime from the tank is showered. This showering is accomplished in the following way. A pump 27 draws milk of lime from the tank 7, through a pipe 28, and feeds the same through a pipe 29, into the top of the tower. The upper portion of the latter is provided with a perforated distributor plate 30 which causes the milk of lime to evenly distribute and spray downwardly over contact blocks 31, which substantially fill the absorption tower.

It will be understood that the valves 22 or 24 may be so loaded that under ordinary circumstances, gas gathering in the accumulators will simply flow back into the down pipes of the accumulators; but if the pressure should build up to a predetermined maximum, then the gas would open one or the other of the valves 24, and the gas from the accumulator would be discharged into the milk of lime tank.

A pipe 32 having a hand controlled valve 33, feeds the liquid $SO_2$ to a coil 34, arranged in a vaporizing tank 35, and from the coil, the vaporized $SO_2$ passes to a conduit 36.

When the atmospheric temperature is high, the liquid $SO_2$ will vaporize in the coil without the use of any heating agent, but in cold weather, it will be necessary, to feed steam or the like through the vaporizer casing by any suitable means, such as valved conduits 37.

The vaporized $SO_2$ may be introduced into the milk of lime in either one of the accumulators, by passing the $SO_2$ into the bottom of the accumulator by way of a pipe 38 which has valved branches 39 and 40 connected to the accumulators.

In order to pass the milk of lime to the accumulators, a pump 41 draws the milk of lime through a pipe 42 and forces the same through a pipe 43, the latter being connected by valved branches 45, 46, 47 and 48, as best shown in Figs. 2 and 3, to the low and high pressure headers immediately above the down pipes 15, 16, 15a and 16a.

When desired, the vaporized $SO_2$ from the pipe 36 may be mixed with the milk of lime while it is flowing through the pipe 43, and for this purpose, the pipes 36 and 43 communicate by way of a valved by-pass pipe 49.

Instead of using the by-pass 49, the vaporized $SO_2$ may be mixed with the milk of lime after the latter has come into contact with relief fluids from the headers 13, 14, and to accomplish this, the pipe 36, as best shown in Fig. 2, is branched at its upper end to provide conduits 50 and 51, having hand controlled valves 52 and 53. The conduit 50 is joined to the down pipes 16 and 16a by means of valved branches 54 and 55, and the conduit 51 is connected to the down pipes 15 and 15a by similar branches 56 and 57.

Acid liquor which has been made and preheated in my system, is discharged from the accumulators through valved conduits 60 and 61, which are joined to a header 62, from which the preconditioned liquor is drawn by a pump 63. The latter forces the liquor through a header 64 that is connected by valved conduits 65 to the lower ends of the digesters.

In proceeding in accordance with my invention, common ordinary burned lime is dumped into the mixer 8, and water is admitted to the same, then by operating the agitators in these mixers, the lime is thoroughly slacked, and afterwards discharged directly into the tank 7. Two slackers 8 are shown, so that one can be slacking while the other is discharging, and in this way, the process is continuous. Of course, for small plants, only one lime slacker will be required.

The milk of lime is fed from the tank 7 by way of the pump 41, into the accumulator, which, at the time, is functioning as a low pressure accumulator, and is receiving relief fluids from the low pressure header 14. At such time, let us assume that the valves are properly set, so that the low pressure relief fluids are fed into the down pipe 15 of the accumulator 4, which, at the time, is working as a low pressure accumulator, while the accumulator 5 is operating as a high pressure accumulator, and is receiving high pressure relief fluids by way of the down pipe 16a. At such time, milk of lime will be forced by the pump 41, through the conduit 43, and by way of the valved branch 46, it will be caused to descend in the down pipe 15. Consequently, it will be mixed with the low pressure relief fluids in this down pipe.

At the same time, the system provides three ways of introducing the vaporized $SO_2$ into the milk of lime. First, it may be fed from the pipe 36, through the valved conduit 49, into the pipe 43 while the milk of lime is flowing through the latter.

Second, it may be passed through the conduit 51, and its valved branch 56, into the down pipe 15 to mix in the latter with the milk of lime and the low pressure relief fluids.

Third, the $SO_2$ may be directly introduced into the bottom of the accumulator 4 (low pressure), by means of conduit 38 and its valved branch 40.

While I prefer to separately use any one of these three modes of procedure, of course, any two of all of them may be used simultaneously.

In this way, the acid liquor is not only manufactured, but as it is made, it is caused to take up the low pressure relief fluids, and thus become heated to some extent.

After the low pressure accumulator has been charged with acid liquor in this way, such acid liquor is heated up by high pressure relief fluids from the digesters. At this time, we will assume that acid liquor in the high pressure accumulator 5 has been heated up to the desired degree to be used as a preconditioned and preheated liquor in a digester which has just been charged with chips or other fibrous material. At such time, the valve in the pipe 61 is opened, and the pump 63 is used to force this hot acid liquor through the header 64 and the proper one of the valved branches 65, into the digester which has just been charged with chips.

When the accumulator 5 has been emptied, it becomes the low pressure accumulator, and the accumulator 4 becomes the high pressure one. Consequently, the valves are manipulated to place the down pipe 15a in communication with the accumulator 5, and the down pipe 16 of the high pressure header into communication with the accumulator 4. At the same time, the flow of $SO_2$ from the tank 6, and milk of lime from the tank 7 is cut off from the accumulator 4, and changed over to the accumulator 5. To this end, the valve in the branch 48 of the milk of lime pipe is opened, and the valve in the pipe 46 is closed, and of course, the vaporized $SO_2$ can be mixed with the milk of lime going to the accumulator 5 in any one of the three ways heretofore mentioned. While the acid liquor is being manufactured in the accumulator 5, and the latter is receiving the low pressure relief fluids from the header 14, the acid liquor in the accumulator 4 is being heated up by the hot relief fluids from the header 13, and is absorbing some of the $SO_2$ coming over from the digesters.

When either one of the accumulators is on the high pressure period of its cycle, of course the pressure builds up therein and must be relieved. Ordinarily, the pressure controlled valve 22 will simply relieve gas from the high pressure accumulator back into the down pipe of that accumulator which is in communication at the time with the high pressure header 13, but where the pressure goes beyond a predetermined maximum, it will open the valve 24 and will relieve the gas back into the milk of lime tank 7. If it is not entirely absorbed in the latter, it will pass through the pipe 26, into the absorption tower 9, where it will meet the milk of lime showering downwardly, and will be completely absorbed.

For the purpose of using the pumped milk of lime to induce the flow of the relief fluids, and vice versa, I prefer to place an injector fitting or nozzle 100 (Fig. 5) at each point where the milk of lime branch pipes join the high and low pressure headers at the upper ends of the down pipes 15, 15a, 16 and 16a.

In a small plant, only one accumulator will be required, and milk of lime will be pumped continuously into this accumulator, and the gas from the tank 6 will be conducted to the discharge side of this pump by way of conduit 49, so that the liquor and gas will be well mixed and then flow to the accumulator.

Instead of using milk of lime, I may mix a soda solution with the $SO_2$ for making the cooking liquor. In the case of producing the sodium bisulphite liquor, it will probably be advantageous to make up a cooking liquor of the following analysis:—

| | |
|---|---|
| Total $SO_2$ | 5% |
| Combined $SO_2$ | 2% |
| Free $SO_2$ | 3% |

I may use barium and strontium salts in place of the regular calcium or magnesium base liquor, or an all magnesium base or part magnesium base.

Normally, where burnt lime is used, lime of a relatively high magnesium oxide content is employed, it being quite common to use a lime with an analysis substantially as follows:—

| | |
|---|---|
| Calcium oxide, CaO | 58.61 |
| Magnesium oxide, MgO | 40.25 |
| Alumina and ferric oxide, $Al_2O_3$ and $Fe_2O_3$ | 0.57 |
| Sulphur trioxide, $SO_3$ | 0.15 |
| Insoluble in HCl | 0.07 |
| Silica soluble in acid, $SiO_2$ | 0.15 |
| Loss on ignition, $H_2O$, $CO_2$ etc | 0.51 |

In the above analysis of burnt lime ordinarily used, I have of course merely given an average analysis, as these limes vary considerably, sometimes running as low as 35% of magnesium oxide and 58% or 60% of calcium oxide. Also occasionally, a lime of very high calcium oxide content is employed. When dolomite is used, the magnesium content runs as high as 46% with a consequent reduction in calcium content and occasionally ground magnesium oxide is used in place of calcium. This ground magnesium oxide runs very high in magnesium content.

My cooking liquor may have a combined calcium and magnesium base, practically all calcium base, sodium base or practically all magnesium base.

From the foregoing it will be understood that I not only employ the accumulators for their usual work of absorbing gas, conserving heat units and preconditioning acid liquor, but in addition, they actually form the acid storage tanks, and thus enable me to hook-up the digesting system and the acid preparation system in such a way as to eliminate parts heretofore considered absolutely necessary for successful working.

While I have disclosed what I now consider to be a preferred embodiment of the invention in such manner that the same may be readily understood, by those skilled in the art, I am aware that changes may be made in the details disclosed, without departing from the spirit of the invention, as expressed in the claims.

What I claim and desire to secure by Letters Patent is:

1. A method of the character described, comprising feeding milk of lime to a pressure accumulator, conducting $SO_2$ to the accumulator, contacting these substances to make acid liquor, and mixing a digester relief fluid with such acid liquor.

2. In a process of the character described, feeding milk of lime to a pressure accumulator, feeding $SO_2$ to said accumulator, simultaneously feeding low pressure relief fluid from a digester to said accumulator, and mixing the milk of lime, $SO_2$ and low pressure relief liquor to form slightly heated cooking liquor in the accumulator, and afterwards introducing high pressure relief fluid from a digester into the accumulator for increasing the temperature and raising the pressure of said acid liquor.

3. In a process of the character described, feeding milk of lime to a pressure accumulator, feeding $SO_2$ to said accumulator, simultaneously feeding low pressure relief fluid from a digester to said accumulator, and mixing the milk of lime, $SO_2$ and low pressure relief liquor to form slightly heated cooking liquor in the accumulator, afterwards introducing high pressure relief fluid from a digester into the accumulator for increasing the temperature and raising the pressure of said acid liquor, and finally introducing the acid liquor thus preconditioned, into a digester charged with fibrous material for initiating the cooking of the latter.

4. In a process of the character described, introducing milk of lime into a pressure accumulator, introducing vaporized $SO_2$ into said accumulator and mixing it with the milk of lime, and simultaneously feeding relief fluid from a digester into the accumulator.

5. In a process of the character described, feeding milk of lime through a passageway into a pressure accumulator, introducing vaporized $SO_2$ into said passageway and mixing the same with the milk of lime, and admixing with said mixture relief fluid from a digester before the mixture flows into the accumulator.

6. A process of the character described, comprising forcing milk of lime through a passageway into a pressure accumulator, introducing $SO_2$ into said passageway and mixing the same with the milk of lime as the latter flows to the accumulator, and admixing with said mixture low pressure relief fluid from a digester.

7. In a process of the character described, flowing milk of lime through a passageway into a pressure accumulator, utilizing the flowing stream of milk of lime to assist in withdrawing low pressure relief fluid from a digester and to mix said fluid with the milk of lime, and introducing vaporized $SO_2$ into the milk of lime flowing through the passageway.

8. In a process of the character described, preparing acid liquor by mixing a suitable liquid and a vapor while the liquid flows through a passageway on the way to a pressure accumulator, and utilizing the substances forming the cooking liquor to absorb the gaseous portion of a relief fluid from a digester.

9. In a process of the character described, introducing milk of lime into a pressure accumulator, mixing a relief fluid from a digester with the milk of lime, introducing vaporized $SO_2$ directly into the accumulator, and mixing the same in the latter with the milk of lime.

10. In a process of the character described, flowing milk of lime through a passageway into a pressure accumulator, mixing vaporized $SO_2$ with said milk of lime, also mixing relief fluid from a digester with the milk of lime, and passing gas from the top of the accumulator back into the lower portion of the accumulator.

11. In a process of the character described, flowing milk of lime through a passageway into a pressure accumulator, mixing vaporized $SO_2$ with said milk of lime, also mixing relief fluid from a digester with the milk of lime, and passing gas from the top of the accumulator back into the milk of lime before the latter flows to the accumulator.

12. In a process of the character described, accumulating hot acid liquor in a pressure accumulator, and utilizing pressure in said accumulator to relieve the latter of gas and to pass said gas into milk of lime to be absorbed by the latter.

13. In a process of the character described, flowing milk of lime, vaporized $SO_2$ and digester relief liquor to a pressure accumulator and thereby depositing in the latter somewhat preheated acid liquor, subsequently using high pressure relief fluid from a digester to increase the temperature of said acid liquor, and afterwards feeding the high temperature acid liquor into a digester charged with fibrous material.

14. An apparatus of the class described, comprising a digester, a pressure accumulator, a milk of lime tank, means for feeding milk of lime from said tank and relief fluid from the digester, into the accumulator, and means for mixing vaporized $SO_2$ with the milk of lime.

15. In an apparatus of the character described, a pressure accumulator, a conduit for feeding milk of lime into the accumulator, a pressure tank for the storage of liquid $SO_2$, and means for vaporizing said $SO_2$ and for feeding the resulting vapor into the accumulator.

16. In an apparatus of the character described, a digester, a pressure accumulator, a milk of lime tank, valved conduits connecting said parts, whereby relief fluid from the digester and milk of lime from the tank may be fed into the accumulator, a source of $SO_2$, and means for mixing said $SO_2$ with the milk of lime.

17. In an apparatus of the character described, a digester, a pressure accumulator, a milk of lime tank, valved conduits connecting said parts, whereby relief fluid from the digester and milk of lime from the tank may be fed into the accumulator, a source of $SO_2$, and means for mixing said $SO_2$ with the milk of lime while the latter is on the way to the accumulator.

18. An apparatus of the class described, comprising an accumulator provided with a pair of down pipes, a distributor placing said down pipes in communication with the interior of the accumulator, a digester, high and low pressure relief headers connecting the upper portion of the digester to said down pipes, a milk of lime tank, means for feeding milk of lime from said tank into either one of said down pipes, a liquid $SO_2$ tank, and conduits connecting the $SO_2$ tank to the last mentioned means for mixing the $SO_2$ with the milk of lime and the relief fluid while they are on the way to the accumulator.

19. In an apparatus of the character described, a pressure accumulator, a distributor for introducing fluids into the lower portion of the accumulator, a pair of feed pipes connected to said distributor, a digester, high and low pressure relief fluid headers placing the digester in communication with said pair of feed pipes, valved passageways for introducing milk of lime into said feed pipes, valved passageways for introducing vaporized $SO_2$ into said feed pipes, passageways for feeding gas from the top of the accumulator into said feed pipes, and a pressure operated valve cooperating with the last mentioned passageways.

20. In a process of the character described, flowing milk of lime, vaporized $SO_2$ and digester relief gases and liquor to a pressure accumulator and thereby depositing in the latter somewhat preheated acid liquor, subsequently using high pressure relief fluid from a digester to increase the temperature and strength of said acid liquor and afterwards feeding the strong high temperature acid liquor into a digester charged with fibrous material.

21. In an apparatus of the character described, a digester, a pressure accumulator, a milk of lime tank, valved conduits connecting said parts, whereby relief fluid from the digester and milk of lime from the tank may be fed into the accumulator, a source of liquid $SO_2$ under pressure, and means for mixing said $SO_2$ with the milk of lime.

22. An apparatus of the class described, comprising a digester having a relief fluid header, a pressure accumulator, a pipe leading into said accumulator, a milk of lime feed conduit, and an injector fitting leading from said conduit across the header into said pipe.

In testimony whereof, I have hereto affixed my signature.

ALBERT DAVIES MERRILL.

ing into said accumulator, a milk of lime feed conduit, and an injector fitting leading from said conduit across the header into said pipe.

In testimony whereof, I have hereto affixed my signature.

ALBERT DAVIES MERRILL.

CERTIFICATE OF CORRECTION.

Patent No. 1,807,320.　　　　　　　　　　　　Granted May 26, 1931.

It is hereby certified that the middle name of the patentee in the above numbered patent was erroneously written and printed as "Davies" whereas said middle name should have been written and printed Darius; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.

CERTIFICATE OF CORRECTION.

Patent No. 1,807,320. Granted May 26, 1931.

It is hereby certified that the middle name of the patentee in the above numbered patent was erroneously written and printed as "Davies" whereas said middle name should have been written and printed Darius; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.